June 26, 1962 J. G. WATTS 3,040,650
BASKET CONSTRUCTION
Filed Dec. 22, 1958 2 Sheets-Sheet 1

INVENTOR.
JAMES G. WATTS
BY
ATTORNEYS

June 26, 1962  J. G. WATTS  3,040,650
BASKET CONSTRUCTION
Filed Dec. 22, 1958  2 Sheets-Sheet 2

INVENTOR.
JAMES G. WATTS
BY
Learman, Learman + McCulloch
ATTORNEYS

United States Patent Office 3,040,650
Patented June 26, 1962

3,040,650
BASKET CONSTRUCTION
James G. Watts, Marathon, Fla., assignor of fifty percent to Bernard S. Frasik, Bay City, Mich.
Filed Dec. 22, 1958, Ser. No. 782,234
4 Claims. (Cl. 99—402)

This invention relates to basket constructions and more particularly to baskets of the kind adapted to be used in conjunction with charcoal and the like grills to support meat or other edibles for rotation adjacent to an open fire so as to permit the edibles to be cooked.

Food articles of the kind adapted to be supported by a basket, as distinguished from being supported on a spit, usually are of such character that they may not be spitted. For example, cubed steaks are not readily conducive to being supported by a spit, nor are many other small articles of food. Accordingly, it has been proposed heretofore to grill such articles in baskets formed of wire or the like so that the food may be suspended and rotated over a charcoal fire and be cooked without having to be spitted. Not all of the baskets in use heretofore have been entirely satisfactory, the principal objection to known baskets being their inability to prevent tumbling of the food articles in the basket as the latter is rotated. With baskets of the kind in use heretofore, it is not unusual to place meat or other foods in such baskets in such manner that they initially are snugly held in place. As the basket is rotated over the fire, however, the meat or other food frequently shrinks, due to the escape of juices and general dehydration, and the shrinkage of the articles of food may be sufficiently great to enable them to tumble as the basket rotates. Tumbling of the food is objectionable because of the possibility that some of the food particles will escape from the basket and, moreover, the tumbling of the food frequently prevents its being cooked evenly throughout.

An object of this invention is to provide a basket construction adapted to be rotated over a charcoal or the like fire and which is capable of supporting articles of food in such manner as to prevent tumbling.

Another object of the invention is to provide a basket construction of the kind referred to in which articles of food contained therein are yieldably maintained in fixed relation to the basket throughout the cooking process.

A further object of the invention is to provide a basket construction adapted to hold articles of food and in which the basket may be quickly and easily loaded and unloaded.

Still another object of the invention is to provide a basket construction of the kind described which is simple in construction and operation and yet rugged and durable in use.

Other objects and advantages of the invention will be referred to specifically or will become apparent from the following description when it is considered in conjunction with the appended claims and the accompanying drawings, in which:

FIGURE 1 is a top plan view of a basket formed in accordance with the invention and containing articles of food in condition to be cooked over a charcoal fire or the like;

Figure 3:
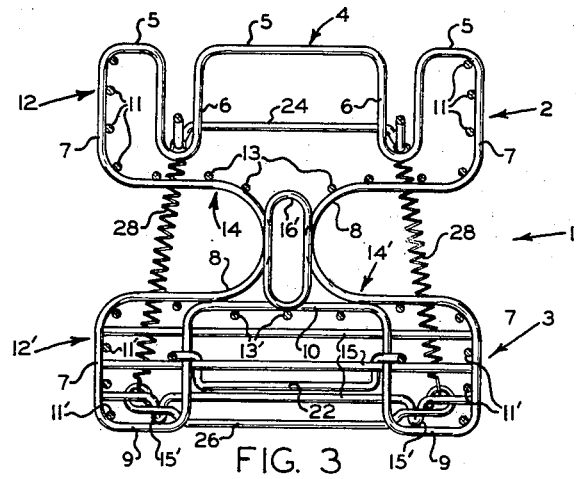
FIGURE 3 is a sectional view taken on the line 3—3 of FIGURE 2.
Figure 4:
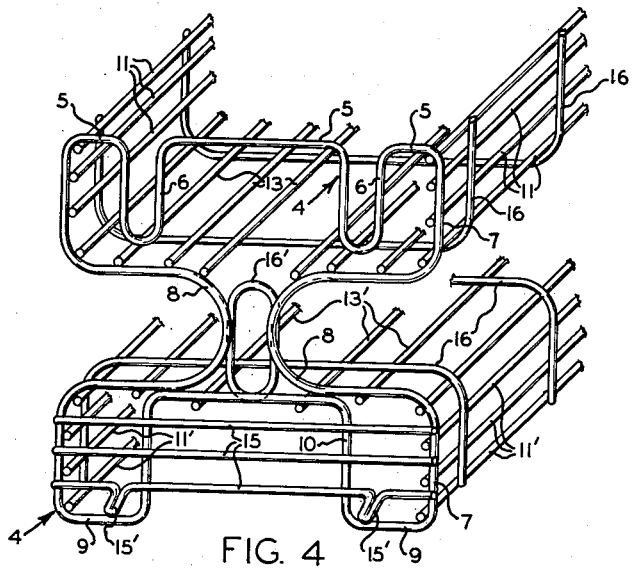
FIGURE 4 is a fragmentary, isometric view of the basket.
Figure 5:
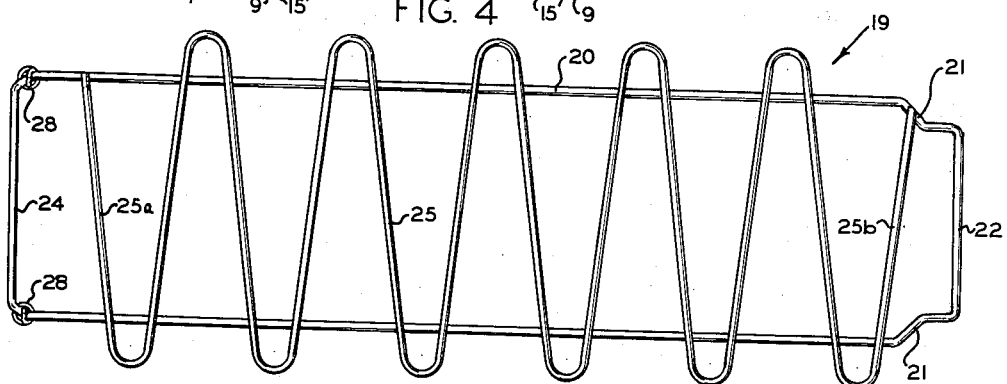
FIGURE 5 is a plan view of a portion of the basket.
Figure 6:
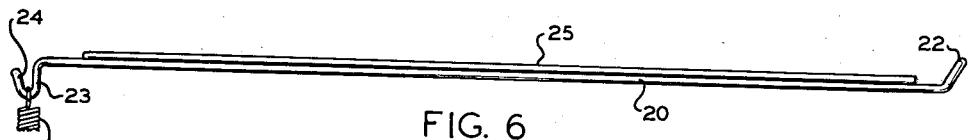
FIGURE 6 is a fragmentary, side elevational view of the apparatus shown in FIGURE 5.
Figure 7:
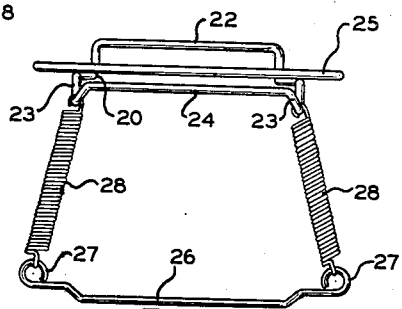
FIGURE 7 is an end elevational view of the structure shown in FIGURES 5 and 6.

A basket formed in accordance with the principles of the invention is represented generally in the drawings by the reference character 1 and is composed of a plurality of wire frame members secured one to another to form a pair of spaced, but connected, body members 2 and 3. At each end of the basket is a frame member 4 formed of wire and which is bent substantially into H shape. Referring principally to FIGURE 3, each frame wire 4 includes a straight run 5 along one edge of the body 2 which is interrupted by a pair of inwardly directed loops 6. The straight run 5 terminates at its ends in a pair of parallel straight runs 7, each of which is interrupted by a fairly large, inwardly directed loop 8. The straight run 7 is joined to a straight run 9 that parallels the run 5 and which is interrupted intermediate its ends by a substantially U-shaped, inwardly directed portion 10. Spanning the end frames 4 and secured thereto by suitable means, such as welding, is a plurality of wire stringers 11 and 11' which form side walls 12 and 12' of the body members 2 and 3, respectively. Other stringers 13 and 13' also span the end frames 4 and are secured to the latter so as to form bottom walls 14 and 14' of the body members 2 and 3, respectively.

At one end of the basket, the loop portions 6 form an end wall for the body member 2, whereas parallel wire stringers 15 form an end wall for the body member 3. One of the stringers 15 has a pair of projections 15' extending therefrom for a purpose presently to be explained. At the other end of the basket, however, the body member 2 has an end wall formed by stringers such as the stringers 15 and the body member 3 has an end wall formed by the loop portions 6. The reason for this construction will be referred to hereinafter. The side and bottom walls of the body portions 2 and 3 preferably are reinforced by U-shaped wire frame members 16 which may be welded or otherwise suitably secured to the stringers 11, 11' and 13, 13' in such manner that the side and bottom walls of the respective body parts 2 and 3 are lattice-like in appearance.

Each of the frame members 4 may be equipped with a preferably elliptical ring 16' which may be welded or otherwise secured to the adjacent ends of the loop portions 8. The rings 16' are so shaped and sized as to receive a spit S (see FIGURE 2) which preferably has a pair of parallel supporting arms 17, 17' interconnected by links 18 and being capable of movement towards and away from one another so as to lie snugly against the ends of the rings 16' and so support the basket 1 for rotation. The elliptical configuration of the rings 16' and the ability of the spit arms 17, 17' to move away from one another enables the basket to be supported on the spit in such manner as to preclude relative rotation therebetween. The basket 1 is particularly adapted for use in conjunction with the spit S, a more detailed disclosure of which will be found in co-pending application Serial No.

714,977, filed February 13, 1958, now abandoned, but the basket is capable of use with any spit having means to prevent relative rotation between the spit and the basket.

A basket formed in accordance with the invention includes a pair of top or cover portions 19, one of which is adapted for use in conjunction with either of the body portions 2 or 3 and the other of which is adapted for use with the other body portion. Both of the top members 19 are identical, so only one will be shown and described in detail.

Each cover member 19 comprises a substantially rectangular frame element 20 formed of wire. At one end of the frame 20 the wire is bent as at 21 to form a projecting portion 22 of reduced width which lies at an angle to the plane of the major portion of the frame member 20. The other end of the frame member 20 is reversely bent as at 23 to form a projecting hook-like portion 24. The overall length of the frame 20 is somewhat greater than the length of the body portion of the basket with which it is adapted to be associated, but the width of the frame is substantially less than the width of the associated body portion. Each of the top members 19 is completed by a substantially zig-zag retaining frame element 25 which is welded or otherwise suitably secured to the frame 20 so as to form with the latter a substantially lattice-like configuration. The frame element 25 extends beyond the edges of the frame 20 so that the overall width of the top 19 is only slightly less than the width of the associated body portion 2 or 3. The end bars 25a and 25b of the frame 25, however, terminate short of the end portions 24 and 22, respectively, of the frame 20 for a purpose to be explained.

Each of the top elements 19 is adapted to be removably secured to its respective body member and form with the side walls and bottom thereof an enclosure in which articles of food may be contained. Means for mounting each of the top members 19 on its respective body member comprises, in part, the extension 22 which is so proportioned as to be inserted between two adjacent stringers 15 at one end of the basket in the manner indicated in FIGURE 3. The spacing of the frame bar 25b from the part 22 assures the insertion of the latter between stringers 15 without interference. The securing means for each top element 19 also comprises a latch bar 26 formed of wire and having a loop 27 at each of its ends. A pair of springs 28 connects the latch bar 26 to the hook portion 24 in such manner that the latch bar 26 substantially parallels the hook portion 24, but is capable of movement towards and away from the latter as permitted by the springs 28.

Figure 2:
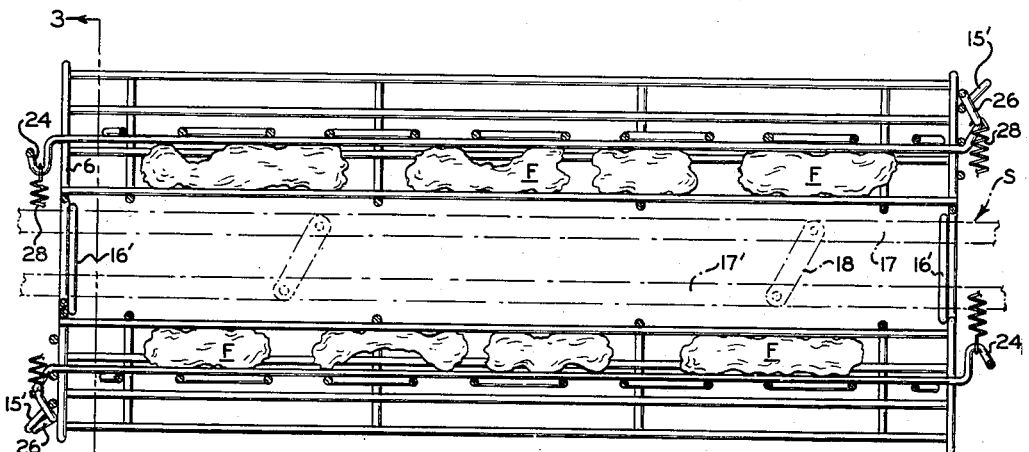
FIGURE 2 is a sectional view taken on the line 2—2 of FIGURE 1 and disclosing the manner in which the basket may be supported on a spit.

The spacing between the hook element 24 and the adjacent bar 25a of the frame member 25 is such as to permit the intervening portions of the frame wire 20 to be received in the inwardly directed loops 6 at one end of each of the body members 2 and 3. When the frame 20 is in this position, the latch bar 26 may be drawn over the projections 15'. As is best shown in FIGURE 2, the projections 15' are canted in such manner as to prevent inadvertent release of the latch bar 26. The length of the springs 28 should be so selected that, even when the top element 19 lies as close to the roots of the loop portions 6 as is possible, the springs will be slightly stretched when the latch bar 26 is in its latched position. Thus, irrespective of the depth of material contained between the top members 19 and their associated bottoms, the tops 19 will be incapable of being separated inadvertently from the basket.

Figure 1:
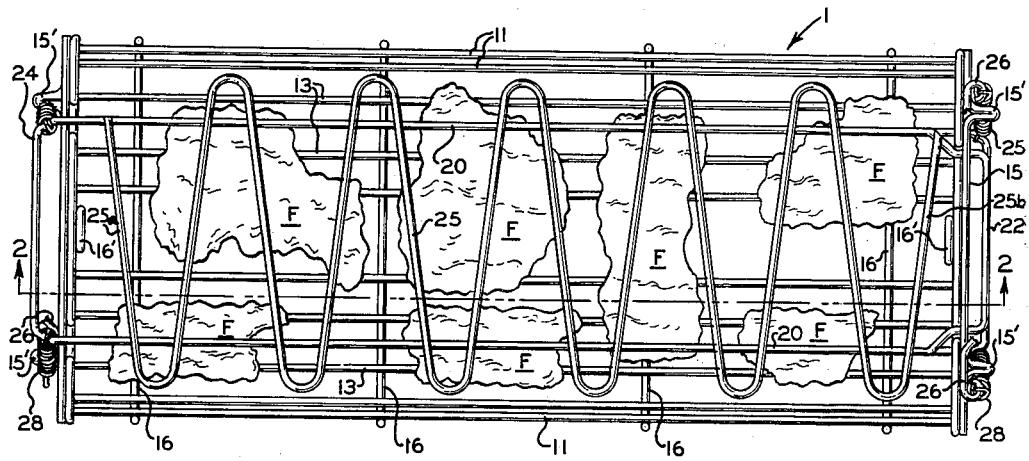

A basket constructed in accordance with the invention may be conditioned for use by removing the top portions 19 and supporting the basket on a table or the like in such manner that one of the body portions 2 or 3 faces upwardly. Articles of food, indicated by the letter F, may be deposited on the bottom of the body portion in the manner shown in FIGURE 1. One of the top elements 19 then may be secured to the associated body member by inserting the projection 22 between adjacent stringers 15 at one end of the body member and by placing corresponding portions of the other end of the frame element 20 in the loop portions 6 so that the hook element 24 overhangs the adjacent end of the body. When installing the top 19, the projection 22 should be placed between the two adjacent stringers 15 which will enable the top to rest with only slight pressure against the food F in the basket. When the top is in the position described, the springs 28 may be stretched to enable the latch bar 26 to be placed behind the keepers 15'. The food in the body then will be held snugly between the bottom and the top. When one body member 2 or 3 has been filled and its top secured, the basket may be turned over and the same procedure followed to fill the other body member.

When both body members have been filled, the spit S may be inserted through the rings 16' and the whole assembly suspended over or adjacent to an open fire. The assembly then may be rotated so as to cook the food in the basket. If the food should shrink during the cooking process due to escape of juices or the like, the springs 28, being under constant tension, will cause the top elements 19 to move towards the bottoms of the respective body members and maintain the food articles in their original positions and prevent their tumbling.

When the food has been cooked to the user's taste, the top portions may be removed by releasing the latch bars 26 from the keepers 15' and withdrawing the projections 22 from between the adjacent stringers 15. The cooked food articles then may be removed from the basket.

The disclosed embodiment is representative of a preferred form of the invention but is intended to be illustrative rather than definitive thereof. The invention is defined in the claims.

I claim:

1. A barbecue basket construction adapted to be mounted on a spit for rotation, said basket construction comprising a pair of open top body members each composed of wire frame elements and each comprising a rectangular bottom having integral opposed side and end walls; means joining said body members one to another with their respective bottoms adjacent and parallel but spaced apart from one another, said means having an opening therein between said body members to receive said spit whereby said body members may be rotated about an axis passing between the bottoms of said body members; a substantially flat, wire grid closure member for the open top of each body member, each closure member being longer and narrower than the bottom of its associated body member, one end wall of each of said body members having a plurality of spaced openings therein paralleling the associated bottom and the opposed end wall of each of said body members having at least one slot therein extending from its edge to adjacent the associated bottom and being perpendicular to the associated bottom, the slotted end walls of said body members being located at opposite ends of said basket construction, each of said closure members being received in its associated body member and having one of its ends inserted in a selected opening of said one end wall and having its other end extending through said slot in the opposed end wall; anchor means on said one end wall of each of said body members; and yieldable means connected to said other end of each of said closure members and removably secured to the adjacent anchor means, said yieldable means constantly exerting a yieldable force on each of said closure members urging the latter toward its associated bottom.

2. The construction set forth in claim 1 wherein said opposed end wall of each of said body members has a pair of said slots that parallel one another and which are spaced from one another to lie in planes extending on opposite sides of the axis of rotation of said body members.

3. The construction set forth in claim 2 wherein said yieldable means comprises a pair of springs connected at corresponding ends to the associated closure member and connected at their opposite ends to a latch bar.

4. The construction set forth in claim 3 wherein said anchor means comprises a pair of hook elements on said one end wall of each of said body members and removably receiving the associated latch bar, the hook elements on each of said body members being spaced from one another to lie in planes extending on opposite sides of the axis of rotation of said body members.

References Cited in the file of this patent

UNITED STATES PATENTS

| | | |
|---|---|---|
| 870,894 | MacDougall | Nov. 12, 1907 |
| 1,712,474 | Serrell | May 7, 1929 |
| 2,144,918 | Garvis | Jan. 24, 1939 |
| 2,747,497 | Brown | May 29, 1956 |
| 2,760,428 | Boyajian | Aug. 28, 1956 |
| 2,895,408 | Glenny | July 21, 1959 |